United States Patent Office 3,312,264
Patented Apr. 4, 1967

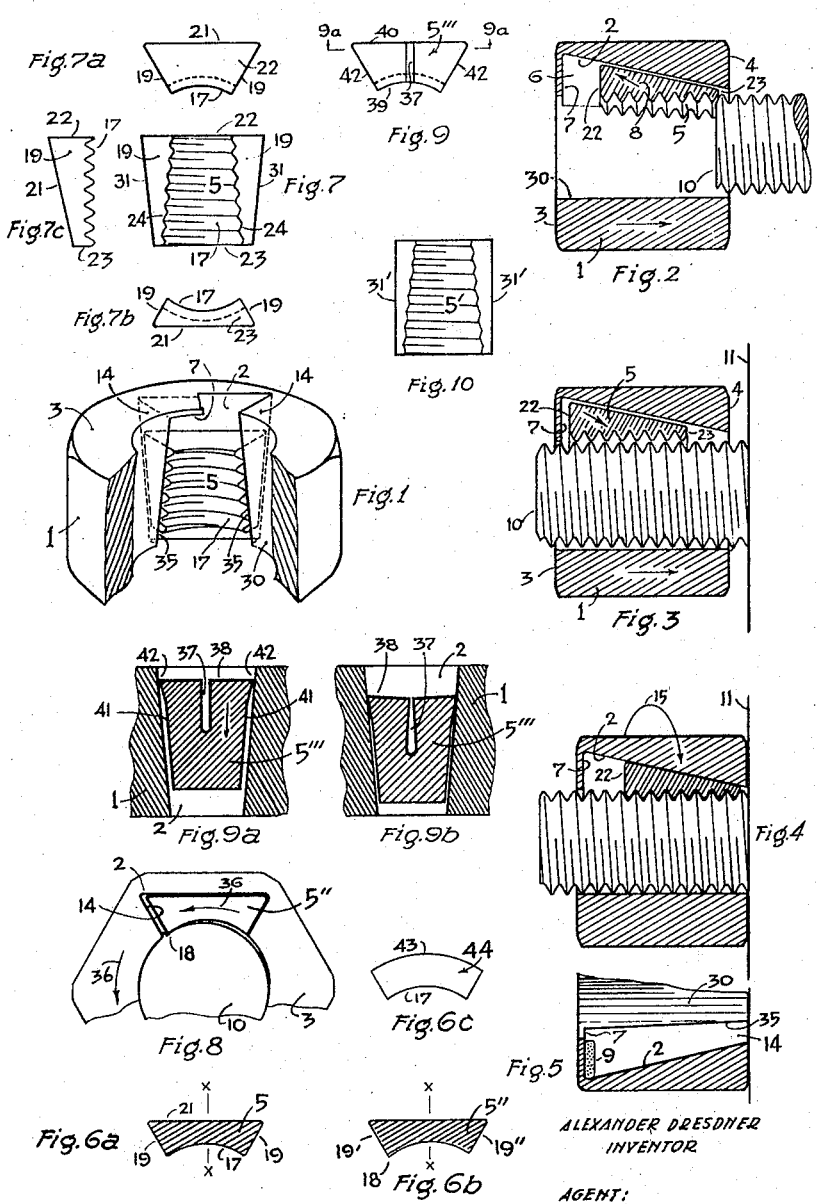

3,312,264
SPEED-LOCK-NUT
Alexander Dresdner, 4630 Decarie Blvd.,
Montreal, Quebec, Canada
Filed June 21, 1965, Ser. No. 465,536
7 Claims. (Cl. 151—19)

The present application is a continuation-in-part application of application Ser. No. 137,438, filed Sept. 5, 1961, now abandoned.

The present invention relates generally to bolt fasteners and, more particularly, to a new lock-nut construction and fastening means.

The lock-nut of the invention is of the quick threaded type, that is, of the type wherein the nut is slipped over the receiving bolt until the front end of the nut abuts the member through which the bolt extends. Thereafter, by turning the nut a few turns, the latter clamps and tightly locks into position.

A main object of the invention resides in the provision of a speed lock-nut of particular use in the assembling of mechanical or structural parts wherein the time element, the locking safety, temporary or permanent, are of importance, as in assembly lines or in the erection of steel structures.

A further object of the invention consists in providing a lock-nut of the above-mentioned type wherein speed of fastening is achieved by permitting the nut to slip over the receiving bolt and to be clamped and locked into position, often with less than two revolutions of the nut.

It is still another object of the invention to provide a speed lock-nut that may be used time and again and that may slip over threaded as well as over unthreaded portions of the receiving bolt.

A still further object of the invention consists in the provision of a speed-lock-nut which is relatively simple in structure and easy to manufacture so that it can be mass-produced at a relatively low cost.

Another object of the invention consists in the provision of a speed-lock-nut which, in accordance with modified embodiments of the wedging insert, is locked on the bolt in a permanent manner.

Further objects and other advantages of the lock-nut of the invention will become apparent as the following description proceeds having regard to the annexed drawings wherein:

FIGURE 1 is a broken-away parallel perspective view of the lock-nut of the invention;

FIGURES 2, 3, and 4 are longitudinal sections of a speed-lock-nut in various stages on the receiving bolt;

FIGURE 5 is a partial longitudinal section through the groove of the nut showing a sponge element;

FIGURES 6a and 6b are cross-sections of two different embodiments of the locking insert;

FIGURE 6c is an end view of another embodiment of the locking insert;

FIGURES 7, 7a, 7b, and 7c are, respectively, elevation end views and a side view of a locking insert;

FIGURE 8 is a partial end view of the lock-nut of the invention with the insert of FIGURE 6b;

FIGURE 9 is an end view of a modified locking insert;

FIGURES 9a and 9b are partial sections of the lock-nut and sections of the locking insert, taken along line 9a—9a of FIGURE 9, said section being parallel to the radially outer face of the insert, and showing the insert in loose and locked positions; and FIGURE 10 is an elevation of yet another modification of the locking insert.

The lock-nut illustrated as a preferred embodiment comprises a body 1 having an outer polygonal configuration and an axial unthreaded bore 30 which extends from a front face 4 to a rear face 3.

Body 1 is provided, inwardly thereof, with an axial segmental groove. By segmental is meant that the groove extends partially of body 1 around bore 30.

The groove has a bottom wall 2 slanting radially outwardly in relation of the axis of bore 30 from the front face 4 while terminating short of the rear face 3, whereby to form a closing wall 7. The groove has lateral walls 14 converging in the general radial direction towards the axis of bore 30, so as to have a general dovetail shape when seen in cross-section. Edges 35 of the groove opening defined by lateral walls 14 and the surface of bore 30 are converging in the axial direction of the nut towards rear face 3. Because bottom wall 2 is slanted, each lateral wall 14 tapers off towards front face 4. The groove is for the reception of a locking wedging insert 5, illustrated particularly in FIGURES 1, 7, 7a, 7b, and 8.

As shown in FIGURES 1, 7, 7a, and 7c, the wedging insert 5 has an arcuate screw-threaded face 17; that is, face 17 is provided with a series of broken parallel screw threads extending transversely thereacross. Insert 5 further has tapering side faces 19 inclined in such a way as to be substantially parallel with the lateral walls 14 of the groove of the nut.

Side faces 19 are converging radially inwardly, that is from the radially outer face 21 of the insert 5 in the direction of threaded face 17. Side faces 19 also are converging axially of the insert towards rear face 22 of the insert away from front face 23 of the insert. Also, longitudinal edges 24 defined by lateral faces 19 and threaded face 17 of the insert, are converging axially of the insert towards rear face 22. Each side face 19 also tapers off towards front face 23 of the insert.

When the insert is inserted in the groove of the nut, its side faces 19 are substantially parallel with the respective lateral walls 14 of the groove and, similarly, the radially outer face 21 of the insert is parallel with the bottom wall 2 of the groove, such that, when the insert is moved longitudinally with respect to the nut, its threaded face 17 will remain substantially parallel to itself and in a cylindrical surface which will remain substantially parallel with the cylindrical surface of bore 30 and will protrude radially inwardly into the bore in the advanced position of the insert towards front face 4, as shown in FIGURE 2, and will retreat radially outwardly from the bore in the retracted position of the insert, as shown in FIGURE 3.

The cross-sectional dovetail configurations of the groove and insert are provided in order to retain the insert within the groove of the nut. The longitudinal dovetail configurations of the groove edges 35 and insert; that is, the fact that the edges 35 of said groove and side faces of the insert are converging longitudinally of the nut and insert towards rear face 3 and 22, respectively, of the nut and insert, causes positive retreating of the insert in a radially outer direction upon longitudinal movement of the insert towards the rear face 3 of the nut, as shown by arrow 8 in FIGURE 2.

This particular configuration of the groove edges 35 and wedge insert will prevent the forward face 23 of insert 5 from abutting the outer end of the receiving bolt 10 when the insert reaches its rear position in the nut 1. If the longitudinal edges 24 of the threaded face 17 and longitudinal edges 35 of the groove opening were parallel, then the insert located, as shown in FIGURE 2, would fall inwards the bore, even in its rearmost position in the nut, and block the free passage of the bolt. In such case, the nut would have to be slipped over the bolt only when the insert is located at the bottom part of the nut; i.e. in the position of 180 degrees from that of FIG. 2.

Due to the above-described configurations alone by which the insert during its longitudinal sliding also retreats radially into the groove by leaving the bore clear, a "Speed-lock-nut" can be slipped over a bolt, screw, threaded or unthreaded rod, with the insert and/or bolt in whatever a position.

In the gap 6 of the groove, formed when insert 5 is at the front end 4 of the nut, may be disposed a sponge element 9, as shown in FIGURE 5, which, however, does not completely bridge that gap between closing wall 7 and rear face 22 of insert 5.

FIGURES 2 to 4 inclusive illustrate how the lock-nut of the invention is used in conjunction with a receiving bolt which extends through a member having an abutting surface 11.

When the bolt starts to enter bore 30, it pushes insert 5 rearwardly and outwardly in accordance with arrow 8 of FIGURE 2 until the insert clears the area of the bore and abuts the closing wall 7 or, preferably, the sponge element 9 letting the bolt to pass through, as shown in FIGURE 3. At that time the crests only of the insert threads are slightly ridden over the crests of threaded portion of bolt 10. After that, the nut is further slipped till front face 4 reaches the abutting surface 11, and upon rotating the nut a few revolutions, as shown by arrow 15, FIGURE 4, the threads of the insert engage those of the bolt, and the insert is brought into wedging engagement with the bottom 2 of the groove, while the whole surface of all the threads of the insert is firmly engaged with the bolt (FIG. 4). Further, the wedging action forces the opposing thread crests of bolt 10 against the unthreaded portion of the bore. A double locking action is thus obtained: one from the frictional resistance created between the wedging surfaces of the insert and the bottom surface of the groove, and the second from the frictional resistance between the screw-threaded portion of bolt 10 and the unthreaded surface of bore 30. The latter resistance is further enhanced by a certain amount of indentation of the screw threads in the material of the nut itself. The reliable fastening of the nut is further due to the fact that the wedging action of the insert is exerted over only a portion of the resilient body, causing elastic deformation to the latter, whereby bore 30 assumes a slightly oval shape.

The amount of radial advancement of the insert into the bore area depends on the amount of taper of the outer face 21 which parallels bottom wall 2 of the groove; that is, depending on the included angle between threaded face 17 and outer face 21. The amount of radial retreatment from said bore area into the groove depends on the longitudinal convergence of the side faces 19, more specifically, the edges 24 of the side faces 19 towards rear face 22 and paralleling edges 35 of the groove opening into the bore.

The sliding out of the insert from one end of the groove is prevented by the converging edges 31 defined by the inclined side faces 19 and radially outer face 21, as shown in FIGURE 7, so that the width of the base of front face 23 is smaller than the width of back face 22, as shown by comparison of FIGURES 7a and 7b.

Alternately, these longitudinal edges 31 may be parallel to one another, as denoted by edges 31' of insert 5' of FIGURE 10, when other means of preventing said insert to slide out from the groove are preferred.

However, the angle of convergence made by the longitudinal edges 31 between themselves may vary and depends on the geometry of the other elements of the insert and groove, namely: the size of the included angle between the outer face 21 and threaded face 17 of the insert together with the amount of longitudinal convergence of the edges 24 of side faces 19 and radial convergence of the same side faces.

In the above-noted embodiment of the insert, the nut can be unscrewed from bolt 10 for re-use. Nevertheless, it is possible to so design the insert as to obtain a permanent locking of the nut on the bolt. A first modification of the insert to provide for permanent locking is shown in FIGURES 6b and 8.

Referring to FIGURE 6b, which is a cross-section of the insert 5″, comparing FIGURE 6b with FIGURE 6a which is a cross-section of the insert of FIGURE 7, it is seen that the insert of FIGURE 6a is symmetrical in shape about axis XX, while the modified insert 5″ in accordance with FIGURE 6b is nonsymmetrical about axis XX.

In FIGURE 6b, the side face 19' is slightly wider than side face 19″, while insert 5″ is located in the groove of nut 1 which is identical to the groove of the nut used for receiving the insert 5. Due to this feature, when the nut provided with the insert 5″ is tightened on a bolt 10, as shown in FIGURE 8, the edge 18 will cause the related side 19' of the insert to have a tighter fit between the bottom wall 2 of the nut groove and the bolt 10 than on the opposite side of the insert. Thus, any attempt at unscrewing the nut in the direction shown by arrows 36 in FIGURE 8 will cause the sharp edge 18 to dig into the threads of the bolt, starting a kind of shaving action of said threads, but the shavings will have little chance to develop due to the very close space for receiving the shavings and, therefore, the bolt will be completely prevented from unscrewing.

FIGURES 9, 9a and 9b show another modification of the insert located in the groove of the nut 1 and which also provides for permanent locking of the nut on the bolt. In accordance with this modification, the insert 5‴ has the same shape as the insert 5 of FIGURES 1, 7, 7a, 7b and 7c, but is provided with a slit 37 extending longitudinally of the insert from its back face 38 forwardly to terminate in about the middle zone of the insert, the slit 37 opening at the back face 38 and also at the threaded face 39 and the radially outer face 40.

Furthermore, the side faces 41 of the insert 5‴ are angled adjacent the back face 38 to form sharp edges 42 at the junction of said faces 41 with the back face 38, the sharp edges 42 protruding outwardly from the remaining portion of the side faces 41 and adapted to dig into the material of the nut at the lateral walls 14 of the groove, to prevent rearward movement of the insert. This is obtained because of the wedging action between the insert and lateral walls of the groove upon radially inward and longitudinally forward movement of the insert relative to the nut.

Upon the above-defined movement of the insert as shown in FIGURE 9, the sharp edges 42 finally attain a pressed fit with the lateral walls 14 and this causes inward bending of the rear wings defined by the slit 37. Due to the resiliency of the material of the metal used to make the insert, the sharp edges 42 dig into the material of the lateral walls 14 and completely prevent backward retracting movement of the insert. Thus, the nut is permanently locked in position on the bolt.

The closing wall 7 serves only to prevent falling out of the insert from the nut groove. No such closing wall is normally needed at the front face 4 of the nut due to the afore-mentioned wedging action between the insert and the groove lateral walls.

Any other means for preventing removal of the insert through the rear face of the nut could be provided.

As shown in FIGURE 6c, the back face of any one of the aforementioned inserts could be rounded, as shown at 43 for insert 44, in which case the bottom wall 2 of the groove of the nut would be similarly rounded transversely of the nut.

While preferred embodiments in accordance with the invention have been illustrated and described, it is understood that various modifications may be resorted to without departing from the scope of the appended claims.

What I claim is:

1. A lock-nut comprising a body having an axial unthreaded cylindrical bore and a front and rear face, said body having a segmental groove running axially thereof and opening into said bore, said groove having a bottom wall slanting radially outwardly from said front face to said rear face, the lateral walls of said groove each tapering towards said front face, said lateral walls converging transversely in the general radial direction towards the axis of the bore in dovetail fashion, the longitudinal edges of said groove defined by said lateral walls and the surface of said bore being substantially straight and converging longitudinally axially of said bore towards said rear face of said nut body, a wedging insert, shorter in length than said groove and slidably received therein, having a rear and a front face, an arcuate screw-threaded radially inner face, a radially outer face making a radial included angle with said threaded face, and flat side faces which converge radially in the direction of said threaded face and longitudinally axially of the insert towards the rear face thereof, the side faces and radially outer face of said insert being generally parallel to and conforming to the lateral walls and bottom wall of said groove and the screw-threaded radially inner face of said insert being a portion of a cylindrical surface substantially parallel to the cylindrical surface of said bore.

2. A lock-nut as claimed in claim 1, further including means on said nut to prevent longitudinal removal of said insert from within said groove.

3. A lock-nut as claimed in claim 2, wherein said means include a wall integral with said nut and extending across the rear end of said groove.

4. A lock-nut as claimed in claim 1, wherein at any transverse cross-section of said insert, one side face of said insert is wider than the opposite side face, to define at the joint of said one side face with the threaded face of said insert a sharper edge adapted to dig into a bolt on which said nut is threaded during attempt at unscrewing the nut from the bolt, to thereby permanently lock the nut on the bolt.

5. A lock-nut as claimed in claim 1, wherein the radially outer face of said insert is transversely convex and, similarly, the bottom wall of said groove is transversely cancave and substantially conforms with the radially outer transversely convex face of said insert.

6. A lock-nut as claimed in claim 1, further including a sponge element, made of resilient material, disposed in said groove between said insert and the rear end of the nut body.

7. A lock-nut as claimed in claim 1, wherein said insert has a longitudinally extending slit in substantially the center thereof, opening at said radially outer face, at said threaded face and at said rear face of said insert and terminating short of the front face of said insert, and the lateral faces of said insert are angled out adjacent the rear face of said insert to provide sharp edges projecting laterally outwardly from the remaining portions of said side faces, said sharp edges adapted to dig into the lateral walls of said groove upon rearward longitudinal displacement of said insert when unscrewing is attempted, to thereby permanently lock said nut on a bolt on which it is threaded.

References Cited by the Examiner

UNITED STATES PATENTS

| 1,204,623 | 11/1916 | Waller | 151—23 |
| 1,220,207 | 3/1917 | Douthit | 151—25 |
| 1,500,531 | 7/1924 | Schweinert et al. | 85—33 |
| 2,294,745 | 9/1924 | Goetz | 85—33 |
| 3,151,652 | 10/1964 | Zahodiskin | 85—33 |

FOREIGN PATENTS

| 628,316 | 8/1949 | Great Britain. |
| 124,396 | 9/1927 | Switzerland. |
| 257,503 | 10/1948 | Switzerland. |

THOMAS F. CALLAGHAN, *Primary Examiner.*

EDWARD C. ALLEN, *Examiner.*

R. S. BRITTS, *Assistant Examiner.*